United States Patent Office.

WILLIAM P. KIRKLAND, OF SAN FRANCISCO, CALIFORNIA.

Letters Patent No. 99,324, dated February 1, 1870.

IMPROVED COMPOSITION FOR THE MANUFACTURE OF WATER, GAS, AND DRAIN-PIPES.

The Schedule referred to in these Letters Patent and making part of the same.

*To all whom it may concern:*

Be it known that I, WILLIAM P. KIRKLAND, of the city and county of San Francisco, State of California, have invented an Improved Composition for the Manufacture of Pipes for Water, Gas, and other purposes; and I do hereby declare that the ingredients used, and the manner of mixing or preparing them, and the manner of making the pipe, together with the best apparatus known to me for that purpose, are described in the following specification.

The principal object of my invention is to combine, with the common or crude asphaltum, a glutinous oil, so prepared, that when mixed with the asphaltum, it will absorb the oil therein contained, and impart the necessary adhesive properties, without the necessity of evaporating the oil which is always found in the asphaltum in its crude state, or adding a pitchy substance to obtain the necessary cohesion.

In preparing asphaltum for the manufacture of pipes, the necessity of melting it is obvious, and the usual method followed is to add a quantity of soft pitch or coal-tar, in order to prevent the material from burning.

It then becomes necessary to evaporate the oil before using by boiling. This operation requires much time and fuel, which is avoided by my method and composition of substances.

To accomplish this object, then, I take any glutinous oil, (I prefer boiled linseed-oil,) and place a sufficient quantity in a fuming bath of strong nitric acid, and then allow it to remain from twenty-four to forty-eight hours, until the oil becomes converted into a mass of soft gum. I then add to the bath, diluted sulphuric acid, say about one (1) part of water to three parts of the sulphuric acid of commerce, in which the oil, previously formed into a soft gum by the action of the nitric acid, is to remain until it becomes dry and tough, which will require from two (2) to five (5) days, but it may remain in the bath for weeks without any material injury.

This part of the process is what I call vulcanizing the oil by means of the chemical action of the sulphuric acid upon it, which, in effect, produces a great degree of elasticity and great toughness.

For the further preparation of the material for making pipes, the mass of gum, as above described, is removed from the aciduous bath, and placed in a kettle or tank, where I liquefy it by a gentle heat, after which I add asphaltum until the desired consistency is arrived at.

The exact proportion of asphaltum to be used cannot be clearly set forth in this connection, owing to the great difference in the quality, some of which is almost destitute of native oil, while other qualities contain a large percentage of oil or oleine matter.

A very good test may be had, however, by placing a small piece of the mixture in the mouth when cool, and if it does not crack by the indentation of the teeth, it may be considered in a proper state of plasticity for the construction of the pipe.

When the gum is combined with pitch or rosin, it will neutralize its brittleness, and render the combination much less liable to soften by heat.

The pipe from this composition is to be constructed in the usual way, well known to workers in asphaltum.

The acid-bath may be used over several times, until the strength is impaired, when it should be replenished with more acids, or renewed entirely.

A very good result may be arrived at by using sulphuric acid alone for treating the oil, but a gum is obtained which is much more brittle than where both the sulphuric and nitric acids are employed.

By this means, the long and tedious process of expelling the native oleine or oil is avoided, and much less heat is required, and the composition is ready for immediate use, and a harder substance than asphaltum is obtained, and less brittle than the product of pitch or coal-tar and asphaltum combined.

To make roofing, and render cloth or felt waterproof, or to unite canvas or roofing-material by cementing the edges, I think my preparation cannot be excelled.

Having thus described my invention,

What I claim, and desire to secure by Letters Patent, is—

1. Treating glutinous oils with acids to produce a gum, substantially as described, and for the purpose set forth.

2. The use of the said oleaginous gum, when so produced, and combined with asphaltum, pitch, or rosin, as and for the purpose specified.

In testimony whereof, I have hereunto set my hand and seal.

WM. P. KIRKLAND. [L. S.]

Witnesses:
C. W. M. SMITH,
PHILIP MAHLER.